United States Patent [19]
Kelsey

[11] Patent Number: 4,889,317
[45] Date of Patent: Dec. 26, 1989

[54] PROPORTIONAL FLOW CONTROL VALVE

[75] Inventor: Christopher G. Kelsey, Sydney, Australia

[73] Assignee: Geoflow International Pty. Limited, Australia

[21] Appl. No.: 249,677

[22] Filed: Sep. 27, 1988

[30] Foreign Application Priority Data

Oct. 14, 1987 [AU] Australia ............................... PI4871

[51] Int. Cl.$^4$ ................................................ F16K 11/00
[52] U.S. Cl. .................................... 251/212; 137/865; 137/887
[58] Field of Search ............... 251/205, 208, 209, 212; 137/637, 637.1, 861, 865, 887

[56] References Cited

U.S. PATENT DOCUMENTS

| | | | |
|---|---|---|---|
| 620,769 | 3/1899 | Hanson | 137/865 |
| 1,172,388 | 2/1916 | Prescott | 251/212 X |
| 1,609,586 | 12/1926 | Thewes | 137/865 X |
| 3,102,710 | 9/1963 | Dresden | 251/212 X |

FOREIGN PATENT DOCUMENTS

| | | | |
|---|---|---|---|
| 1002633 | 3/1952 | France | 137/637.1 |
| 189733 | 10/1963 | Sweden | 251/212 |

Primary Examiner—John Fox
Attorney, Agent, or Firm—Stevens, Davis, Miller & Mosher

[57] ABSTRACT

A valve for the proportioning of fluid flow between orifices (14,15) consists of a first cylinder (16) provided with a tapering circumferential groove (19) in its periphery, and a pair of cylinders (17,18) contacting the first cylinder respectively in the path between those orifices and a single orifice (13). The pair of cylinders (17,18) have tapered circumferential grooves (20,21) arranged so that rotation of the cylinders causes opening of one path and closing of the other.

18 Claims, 3 Drawing Sheets

PROPORTIONAL FLOW CONTROL VALVE

FIELD OF THE INVENTION

This invention relates to valves for the control of fluid flow, for example in hydraulic circuits or other applications requiring the controlled diversion of a flow of fluid into two paths.

Valves incorporating the invention will provide advantages in many fields of application, including, for example, vehicles driven by hydraulic motors in which individual motors are associated with a pair of driving wheels. In such a vehicle, it would be desirable to employ a constant displacement pump and vary the fluid supply or pressure between the pair of wheel motors by the use of a valve capable of proportional and continuous flow control.

BACKGROUND ART The present invention employs the principles described in United Kingdom patent specification No. 2,056,027 to provide such a valve. Embodiments of the invention may also employ the subject of applicant's co-pending Australian patent application No. 76822/87.

SUMMARY OF THE INVENTION

In one form, the invention comprises a valve comprising first, second and third orifices and means controlling the cross-section of fluid flow between said first and second and said first and third orifices, said means comprising a first cylinder mounted for rotation about its axis and having its periphery in contact with a first sealing surface at a region between the first and second orifices, a second cylinder mounted for rotation about its axis and having its periphery in contact with a second sealing surface at a region between the first and third orifices, each cylinder having a circumferentially extending groove formed in its periphery, the depth of which groove increases from one end of the groove to a point of maximum depth and decreases from said point of maximum depth to the other end of the groove.

In another form, the invention comprises a valve comprising first, second and third orifices and means controlling the cross-section of fluid flow between said first and second and said first and third orifices, said means comprising a first cylinder mounted for rotation about its axis, and having its periphery in contact with a first sealing surface at a region between the first and second orifices, a second cylinder mounted for rotation about its axis and having its circumferential surface in contact with a second sealing surface at a region between the first and third orifices, each cylinder having a circumferentially extending groove formed in its periphery, the depth of which groove increases from one end of the groove to a point of maximum depth and decreases from said point of maximum depth to the other end of the groove.

Preferably, each of the sealing surfaces comprises the periphery of a cylinder mounted for rotation with the cylinder with which it co-operates. In preferred forms therefore, the invention comprises a valve comprising first, second and third orifices and means controlling the cross-section of fluid flow between said first and second and said first and third orifices, said means comprising a first cylinder mounted for rotation about its axis, a second cylinder mounted for rotation about its axis and having its periphery in contact with that of the first cylinder at a region between the first and second orifices, a third cylinder mounted for rotation about its axis and having its periphery in contact with that of the first cylinder at a region between the first and third orifices, said axes being parallel, at least the first cylinder or each of the second and third cylinders having a circumferentially extending groove formed in its periphery.

In preferred forms, each of the cylinders is provided with a circumferentially extending groove, the groove depth in each case increasing from one end of the groove to a point of maximum depth and decreasing from that point to the other end of the groove, and the grooves are so contoured and orientated that they form a pair of apertures controlling the fluid flow, such that one aperture decreases in cross-section as the other aperture increases, and vice versa.

BRIEF DESCRIPTION OF THE DRAWINGS The invention will now be described, by way of example only, with reference to two embodiments thereof illustrated in the accompanying drawings, in which.

DETAILED DESCRIPTION OF PREFERRED EMBODIMENT

Figure 1:
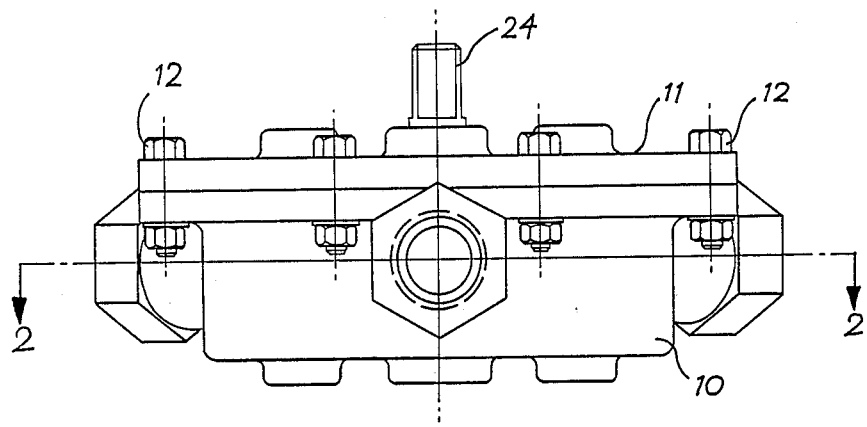
FIG. 1 is an end elevation of the valve.
Figure 2:
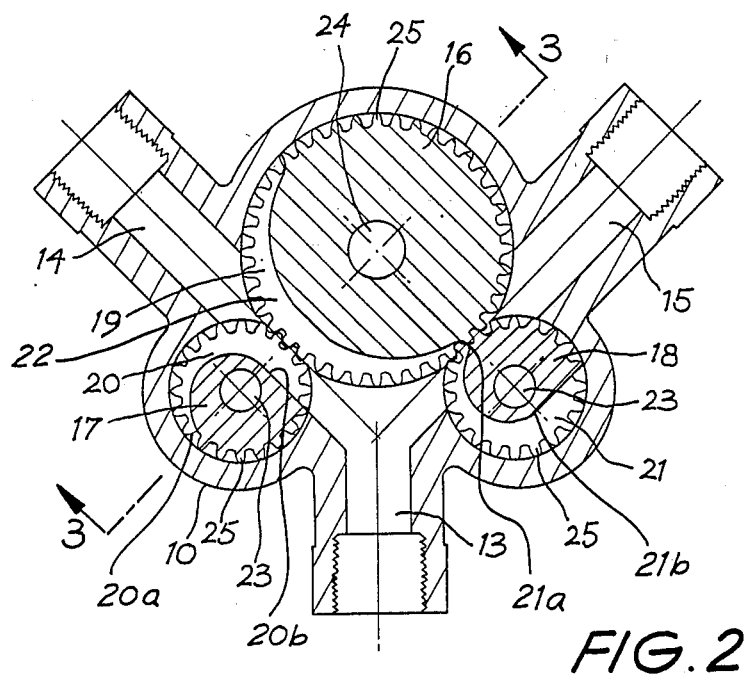
FIG. 2 is a sectional plan view taken on the line 2—2 of FIG. 1.
Figure 3:
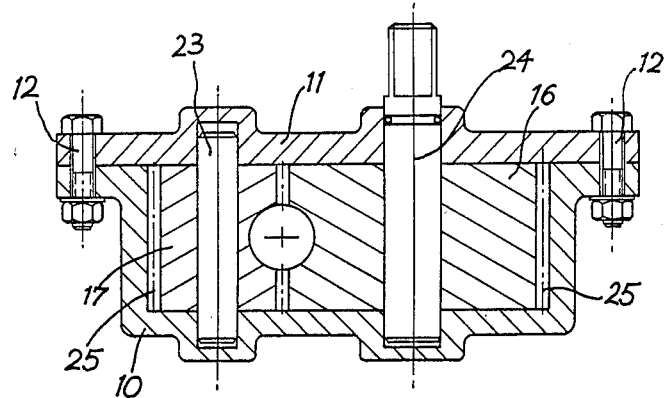
FIG. 3 is a sectional elevation taken on the line 3—3 of FIG. 2.

The valve illustrated in FIGS. 1 to 3 comprises a housing 10 and a cover 11 each of which is provided with a peripheral flange for assembly by means of bolts 12. The housing 10 provides an inlet passage 13 communicating with a pair of outlet passages 14 and 15 in a "Y" configuration, and houses valve rollers 16, 17 and 18.

The respective small diameter rollers 17 and 18 engage the large roller 16 at a line of contact which is on the axis of the respective outlet passages 14 and 15, while in accordance with the principles of the previously mentioned United Kingdom patent, a substantial portion of the circumference of each of these rollers is provided with a groove the depth of which changes along its length, these grooves being indicated respectively at 19, 20 and 21.

As will be observed in FIG. 2, the depth of the grooves 20 and 21 of the small rollers 17 and 18 is contoured in a manner substantially the same as that of the grooves of the rollers in the previously mentioned United Kingdom patent. Thus these grooves 20 and 21 extend from a point on the roller periphery shown respectively at 20a and 21a, to a point of maximum depth 20b and 21b, continuing linearly beyond these points at a tangent to the groove bottom. The groove 19, however, which extends around approximately 180° of the periphery of the large roller 16, has a depth which decreases symmetrically on either side of a central point of maximum depth 22.

Preferably the cross-section contour of the grooves 19, 20 and 21 is identical, and the maximum depth of each is also the same. As revealed by FIG. 3, the contour in this embodiments is semi-circular.

Each of the small rollers 17 and 18 is mounted on a shaft 23 which is journalled in the housing 10 and the cover 12, while the large roller 16 is mounted on a shaft 24 which extends through the cover 12 where it may be engaged for operation of the valve.

In accordance with the teachings of the previously mentioned Australian patent application, the cylindrical faces of the rollers are provided with complementarily formed teeth 25, which provide a positive seal between the faces of the rollers at the point of their interengagement and also provide a seal against the inner wall of the housing 10. The end faces of the rollers seal against the opposed faces of the housing 10 and the cover 11.

The large roller 16 has a diameter (or number of teeth) which in this embodiment is twice that of the rollers 17 and 18. Reference to FIG. 2 will reveal that the valve is there illustrated in a position in which the outlet passage 14 is fully open, while the outlet passage 15 is fully closed, with the point of maximum groove depth of the large roller 16 being radially opposite the point of greatest depth of the small roller 17, and the most anticlockwise end of the groove 19 being opposite the closed end of the groove 21. If now the large roller 16 is rotated anti-clockwise (as viewed in FIG. 2), the small rollers 17 and 18 with rotate clockwise at twice the speed of the roller 16, so that progressively the outlet passage 14 will be obstructed and the outlet passage 15 will be opened.

The rollers 17 and 18 are provided with identically contoured grooves, and will in fact be identical rollers, assembled in opposite vertical orientation. The total cross-sectional area for fluid flow presented by the roller pairs 16,17 and 16,18 will be constant, and in this way the division of flow of fluid through the valve may continuously be controlled at a constant rate or pressure. In other embodiments of course, the contour of the grooves may be altered, and may differ as between roller pairs, for other purposes. As also in the prior art referred to it is not essential that both the roller 16 and the rollers 17 and 18 be provided with grooves. The roller 16 only may be grooved, or the rollers 17 and 18 only.

Figure 4:
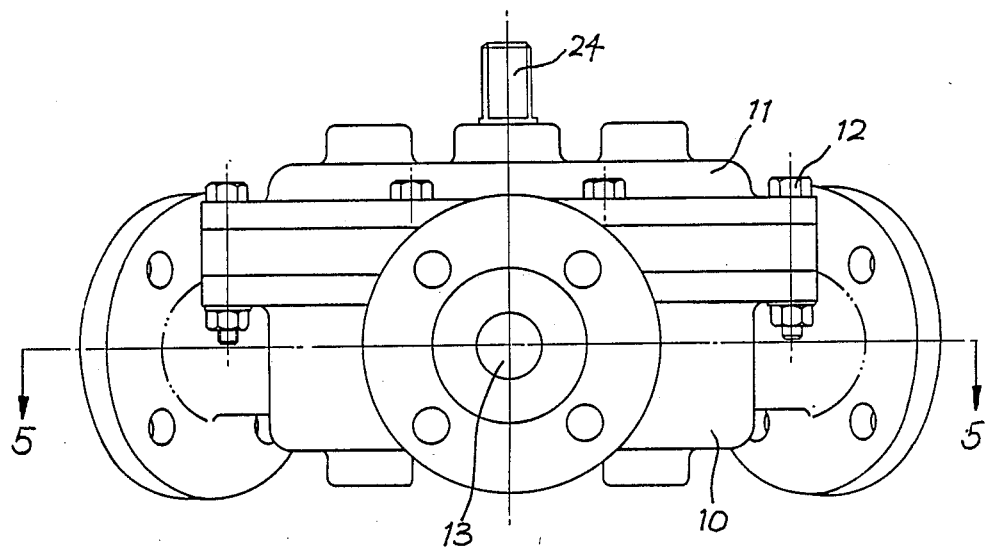
FIG. 4 is an end elevation of a valve according to a second embodiment of the invention.
Figure 5:
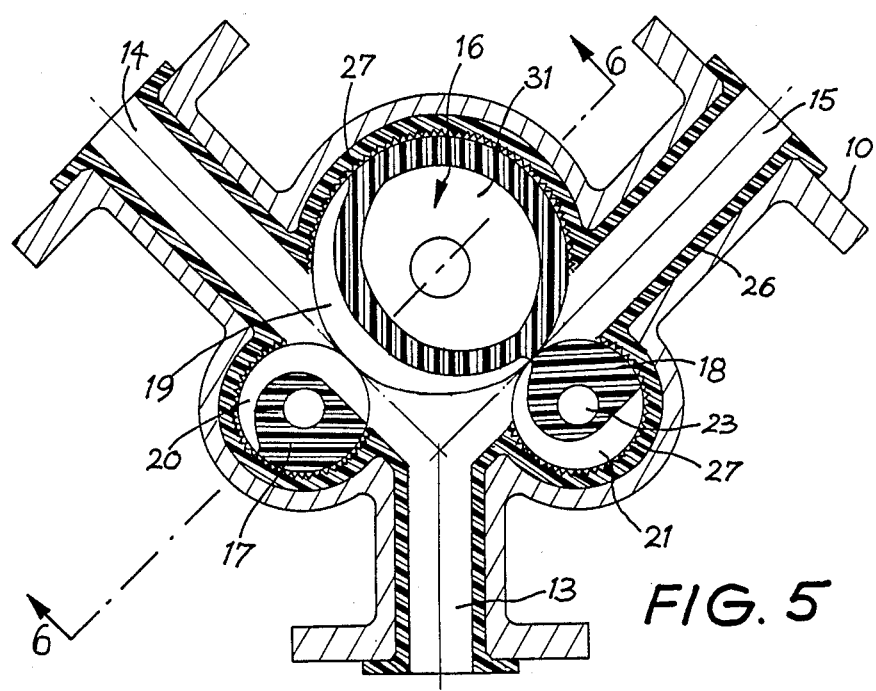
FIG. 5 is a sectional plan view taken on the line 5—5 of FIG. 4.
Figure 6:
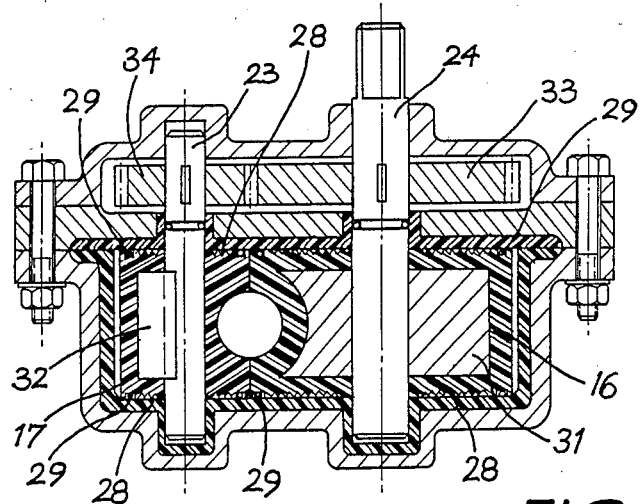
FIG. 6 is a sectional elevation taken on the line 6—6 of FIG. 5.

In the embodiment illustrated in FIGS. 4 to 6, the teeth 25 are dispensed with and the rollers engage at their plain cylindrical surfaces. The housing 10 and the cover 11 are provided with a lining 26 of polyurethane, which in the portions surrounding the rollers is provided with vertical serrations 27 for sealing engagement with the cylindrical surfaces of the rollers. Sealing with the end faces of the rollers is achieved by the provision of circular serrations 28 on the roller end faces, and O-rings 29.

The roller 16 is constructed with a polyurethane outer cover 30 over a metal centre 31, and as in the previous embodiment is turned by a shaft 24 extending through the cover 11. The small rollers 17 and 18 may be of solid polyurethane and are mounted in shafts 23 with keys 32. In order to drive the small rollers, gears 33 and 34 are provided respectively on the shafts of the large roller 16 and small rollers 17 and 18.

It will be understood that the invention is not limited in its application, to valves constructed in the manner shown in the illustrated embodiments. For example, in the case where only the roller 16 is grooved, at the expense of an increase in friction the rollers 17 and 18 may be replaced by a stationary surface contacting the periphery of the roller 16. Similarly where only the rollers 17 and 18 are grooved, the roller 16 may be eliminated, and replaced by a stationary surface or surfaces contacting the rollers 17 and 18.

What is claimed:

1. A valve comprising first, second and third orifices and means controlling the cross-section of fluid flow between said first and second and said first and third orifices, said means comprising a cylinder mounted for rotation about its axis, a first sealing surface in contact with the periphery of the cylinder at a region between the first and second orifices, a second sealing surface in contact with the periphery of the cylinder at a region between the first and third orifices, the cylinder having a circumferentially extending groove formed in its periphery, the fluid flow being bounded by said groove and said first and second sealing surfaces, the depth of which groove increases from one end thereof to a point of maximum depth and decreases from said point to the other end thereof.

2. A valve according to claim 1 wherein the length of the groove in the cylinder is such that during operation of the valve between extremes of rotational movement of the cylinder, the region of contact between the first sealing surface and the cylinder moves between said point of maximum depth and one end of said groove, and the region of contact between the second sealing surface and the cylinder moves between the other end of said groove and said point of maximum depth.

3. A valve according to claim 2 wherein the first and second sealing surfaces are spaced apart such that when said point of maximum depth is at the region of contact between the cylinder and one of the first and second sealing surfaces, an end of said groove is at the region of contact between the cylinder and the other of said sealing surfaces.

4. A valve according to claim 3 wherein at least one of the first and second sealing surfaces is provided by the periphery of a further cylinder mounted for rotation with the first-mentioned cylinder.

5. A valve comprising first, second and third orifices and means controlling the cross-section of fluid flow between said first and second and said first and third orifices, said means comprising a first cylinder mounted for rotation about its axis, a second cylinder mounted for rotation about its axis and having its periphery in sealing contact with that of the first cylinder at a region between the first and second orifices, a third cylinder mounted for rotation about its axis and having its periphery in sealing contact with that of the first cylinder at a region between the first and third orifices, said axes being parallel, wherein the periphery of the first cylinder has a circumferentially extending groove, the depth of which increases from one end thereof to a point of maximum depth and decreases from said point to the other end thereof.

6. A valve according to claim 5 wherein the length of the groove in the first cylinder is such that during operation of the valve between extremes of rotational movement of the first cylinder, the region of contact between the first and second cylinders moves between said point of maximum depth and one end of said groove in the first cylinder, and the region of contact between the first and third cylinders moves between the other end of said groove in the first cylinder and said point of maximum depth.

7. A valve according to claim 6 wherein said second and third cylinders are spaced apart such that when said point of maximum depth is at the region of contact between the first and one of the second and third cylinders one end of said groove is at the region of contact between the first cylinder and the other of said second and third cylinders.

8. A valve according to claim 7 wherein a circumferential groove is provided in the periphery of each of the second and third cylinders.

9. A valve according to claim 8 wherein the depth of the groove in each of the second and third cylinders increases between an end at the cylinder periphery and a point of maximum depth peripherally spaced from said end.

10. A valve according to claim 9 wherein the grooves of the second and third cylinders are located and orientated such that when the point of maximum depth of the groove of the first cylinder is at the region of contact between the first and one of the second and third cylinders, the point of maximum depth of the groove of the said one cylinder is at said region, and the end of the groove of the other of said second and third cylinders is at the region of contact between said other cylinder and the first cylinder.

11. A valve according to claim 10 wherein the groove of each of the second and third cylinders extends beyond the point of maximum depth, in a substantially tangential direction from the point of maximum depth.

12. A valve according to claim 5 wherein each of the second and third cylinders are provided with such a circumferentially extending groove, the groove depth in each case increasing from one end of the groove to a point of maximum depth and decreasing from said point of maximum depth to the other end of the groove.

13. A valve according to claim 12 wherein the grooves of the second and third cylinders are located and orientated such that when the point of maximum depth of the groove of one of them is at the region of contact between that cylinder and the first cylinder, an end of the groove of the other of them is at the region of contact between the other of them and the first cylinder.

14. A valve according to claim 13 wherein the diameter of the second and third cylinders is one half of the diameter of the first cylinder.

15. A valve comprising first, second and third orifices and means controlling the cross-section of fluid flow between said first and second and said first and third orifices, said means comprising a first cylinder mounted for rotation about its axis, and having its periphery in contact with a first sealing surface at a region between the first and second orifices, and in sealing contact with said first cylinder, a second cylinder mounted for rotation about its axis and having its circumferential surface in contact with a second sealing surface at a region between the first and third orifices, each cylinder having a circumferentially extending groove formed in its periphery, the fluid flow being bounded by said grooves and said first and second sealing surfaces, the depth of which groove increases from one end of the groove to a point of maximum depth and decreases from said point of maximum depth to the other end of the groove.

16. A valve according to claim 15 wherein the cylinders are located and orientated such that when the point of maximum depth of the groove of one of them is at the region of contact between the cylinder and the first sealing surface, an end of the groove of the other of them is at the region of contact between the other of them and the second sealing surface.

17. A valve according to claim 16 in which the first and second sealing surfaces are provided by the periphery of the a third cylinder mounted for rotation with the first and second cylinders.

18. A valve comprising first, second and third orifices and means controlling the cross-section of fluid flow between said first and second and said first and third orifices, said means comprising a first cylinder mounted for rotation about its axis, a second cylinder mounted for rotation about its axis and having its periphery in sealing contact with that of the first cylinder at a region between the first and second orifices, a third cylinder mounted for rotation about its axis and having its periphery in sealing contact with that of the first cylinder at a region between the first and third orifices, said axes being parallel, wherein each of the second and third cylinders are provided with a circumferentially extending groove, the groove depth in each case increasing from one end of the groove to a point of maximum depth and decreasing from said point of maximum depth to the other end of the groove.

* * * * *